Oct. 28, 1941.                A. RAPPL                2,260,867
                               PUMP
                     Filed July 19, 1938           2 Sheets-Sheet 1
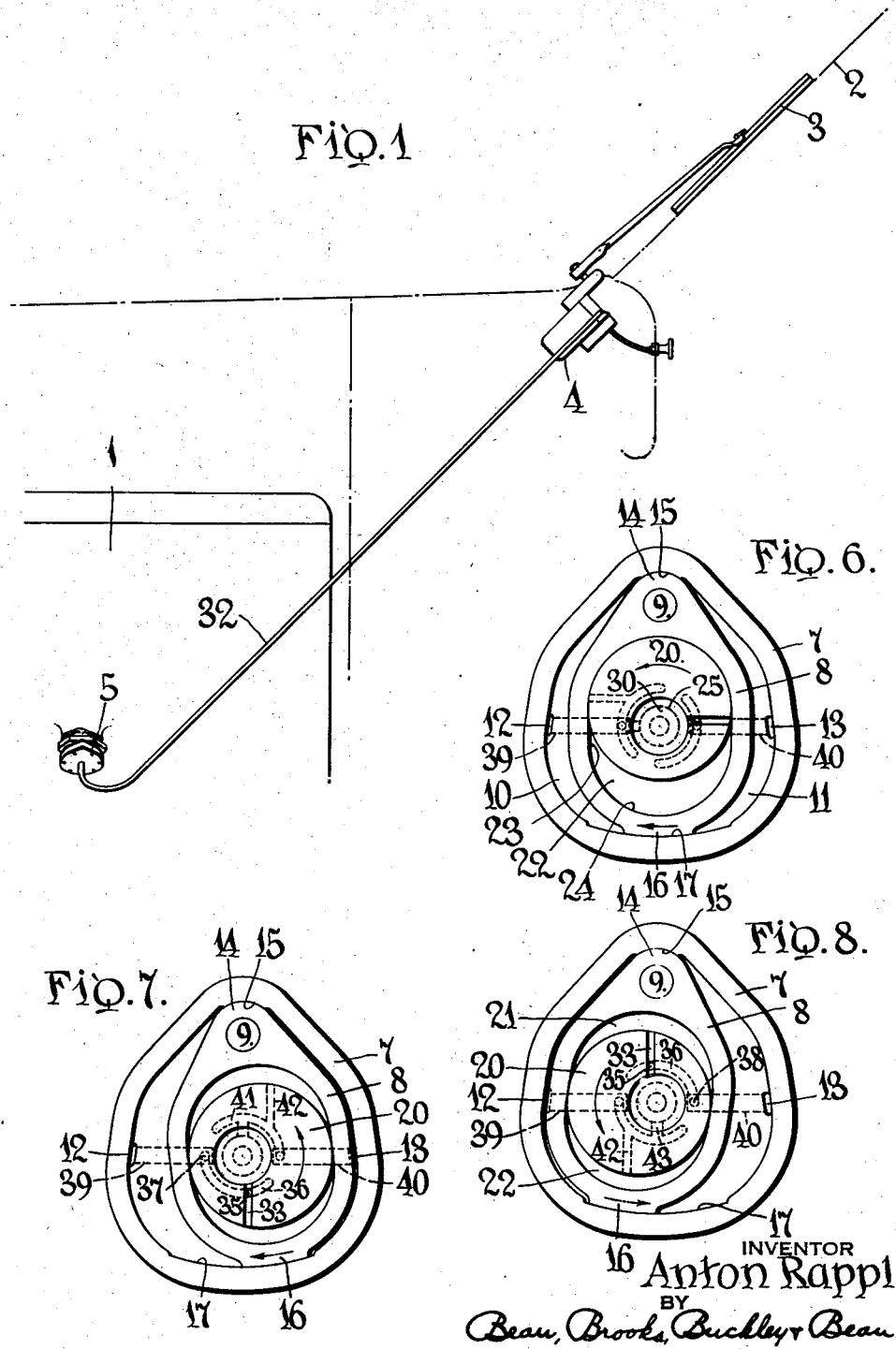

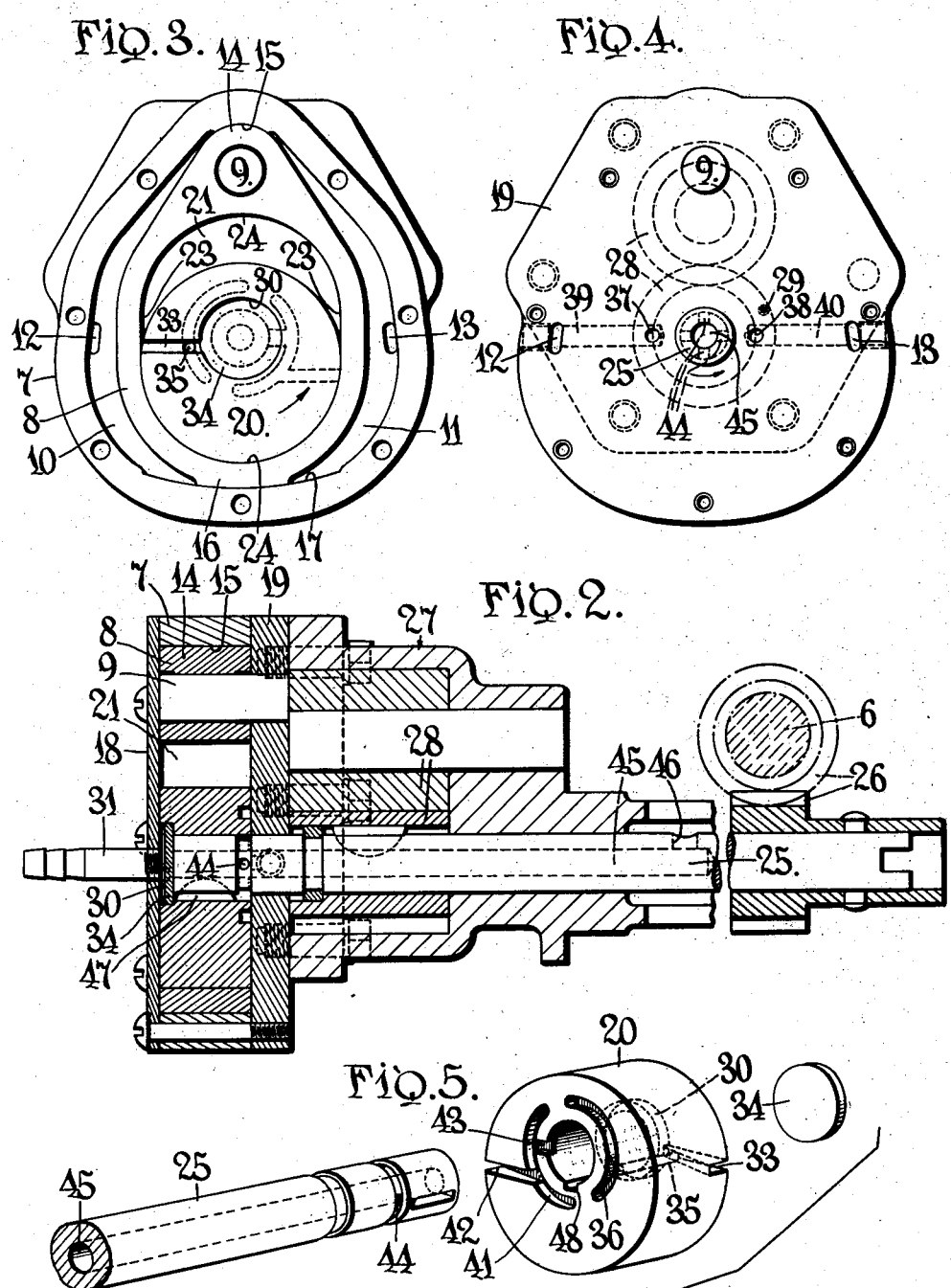

Patented Oct. 28, 1941

2,260,867

UNITED STATES PATENT OFFICE 2,260,867

PUMP

Anton Rappl, Eggertsville, N. Y., assignor to Trico Products Corporation, Buffalo, N. Y.

Application July 19, 1938, Serial No. 219,965

15 Claims. (Cl. 103—4)

This invention relates to a pump and more particularly to one which is especially adapted for serving as a source of fluid pressure for the operation of windshield cleaners and other automotive accessories. It is primarily intended for displacing air but obviously may be utilized for pumping liquids.

Pumps of various types and designs have been suggested for replacing the intake manifold as a source of suction in an attempt to secure a uniform wiper action. In operating a pump from the vehicle power plant there is a wide range of speed. Consequently, the pump must be efficient at a low speed as well as when operating at a fast rate, and with the high speed of the present day automobile it has been difficult to make a pump stand up under the great strain resulting from the excessive speed of the vehicle power plant. Wear and tear on the pump structure and imperfect valve action or responsiveness at high speeds tend toward impairment of the pump's efficiency.

The present invention has for its aim and purpose to provide a simplified construction in which the moving parts are reduced in number to a minimum while a maximum supply of pressure or suction is made available for the intended use. Further, the invention resides in a practical multiple pump arrangement and combination resulting in economy of manufacture and compactness in assembly.

The invention will further be found in the salient features of construction and their association in the completed pump, as will more fully appear hereinafter, reference being made to the accompanying drawings wherein Fig. 1 illustrates one use of the invention in a motor vehicle power plant;

Fig. 2 is a longitudinal sectional view through the invention when mounted on the vehicle oil pump;

Fig. 3 depicts the improved multiple pump of the present invention with its cover plate removed;

Fig. 4 is an elevation of the base plate showing the pump passages therethrough;

Fig. 5 is an exploded view in perspective of the driving piston;

Fig. 6 is a diagrammatic view depicting the driving piston removed one-half cycle from its position shown in Fig. 3; and Figs. 7 and 8 are similar views showing the vane piston in its two limit positions.

Referring more particularly to the drawings, the numeral 1 designates the engine of a motor vehicle, 2 the windshield, 3 the wiper, and 4 the air operated motor for actuating the wiper on the shield, the motor being connected by a line of communication to the improved pump 5 which may be conveniently mounted on the side of the engine crank case for being driven from the cam shaft 6, or from some other suitable driving part on the vehicle.

The pump, according to the illustrated embodiment, comprises a primary and a secondary pumping unit, the primary having a casing 7 in which is oscillatably mounted a vane type piston 8 for movement back and forth about the axis of pivot pin 9. The vane or piston divides the interior of casing 7 into opposed chambers 10 and 11, having ports 12 and 13, respectively. The pivoted or inner end portion 14 of the vane, beyond the pin 9, is shaped concentrically to have sliding fit in a similarly shaped recess 15 formed in the surrounding side wall of the casing. The outer end portion 16 of the vane has sliding fit on an arcuate wall portion 17 shaped about the pivotal axis 9 as a center. With the chambers 10 and 11 being closed by the end walls 18 and 19 of the casing and the vane sliding on said end walls, it will be apparent that as the vane moves to the left (Fig. 3) it will expel fluid from chamber 10 through port 12 and simultaneously intake fluid through port 13 into chamber 11, and upon the reverse stroke chamber 10 will receive a charge of fluid while chamber 11 will concurrently become evacuated.

For compactness and simplicity, the secondary pumping unit is incorporated in the vane for which purpose the latter is formed with a substantially elliptical compartment receiving the piston forming member 20 and having flat parallel side walls 23 joined at their opposite ends by arcuate walls 24. The piston is cylindrical in shape and of a diameter substantially equal to the spacing of the parallel side walls 23 for sliding contact therewith to thereby seal chamber 21 from chamber 22. The end walls substantially correspond in curvature to that of the piston 20 to enable a more complete evacuation of the opposed end chambers 21 and 22 as the piston rotates therein. The piston member 20 is eccentrically mounted by a shaft 25 that serves as a drive shaft and in turn derives its power from a suitable source, such as the cam shaft 6 of the engine to which it is connected by gearing 26.

The casing 7 may be attached directly to the wall of the crank case, or it may be mounted on the oil pump 27, the gears 28 of which are driven by the shaft 25. The oil pump, forming a part of the engine lubricating system in which it is connected by the usual passages (not shown), also has a restricted branch passage 29 leading from its pressure side to and discharging into the casing 7 for lubricating and sealing the metal to metal contacts between and the sliding engagements of the pump parts 7, 8 and 20 just described. The base plate or end wall 19, in this arrangement partitions the oil pump from the multiple pump.

It will be apparent from the foregoing that as the drive shaft 25 revolves the piston 20 will rotate to first enlarge one of the chambers 21, 22 and concurrently ensmall the companion chamber, and then evacuate the first chamber and simultaneously intake fluid into the other chamber. During this cycle of operation the piston 20 drives the vane back and forth. The piston 20 therefore serves in a dual capacity, first in its primary capacity and second as a means for camming the vane back and forth.

The chambers 10, 11, 21 and 22 are preferably mechanically ported and for properly timing the intervals during which they are opened and closed the porting for all the chambers is placed under the control of one of the two pistons. In the illustrated embodiment, the cam-acting or driving piston 20 is caused to perform this still further function, and accordingly it is formed in its front face with an inlet recess 30 opposing the air inlet nipple 31, to which the suction operated accessory 4 is connected by a conduit 32. This recess is extended by a substantially radial passage 33 to the periphery of the cylindrical piston. For convenience in manufacture the inlet recess is formed by counterboring the shaft receiving opening through the piston and is blocked off therefrom by a closure disk 34. Each operation of the rotating piston 20 which effects enlargement of either of the chambers 21 and 22 results in an indraft of air through the recess 30 and passage 33 to fill the chamber with the gas.

For admitting air to the chambers 10 and 11 the inlet recess is joined by a duct 35 to a groove 36 which is formed in the rear face of the piston 20 concentric with the axis of rotation to alternately register with or wipe over the ports 37 and 38. These latter ports connect with the chamber ports 12 and 13 by passages 39 and 40 formed in the base plate and therefore as the rotating piston places the groove 36 in communication with one or the other of the ports 37, 38, the respective chambers 10, 11 will intake air by reason of the chamber enlarging movement of the vane as imparted thereto by said piston 20.

It will be observed that the four pump chambers are enlarged and ensmalled in rotative progression, as in the order 10, 22, 11 and 21, and that this cycle is about equally divided among the four chambers with respect to the two pumps. It requires substantially one-half cycle of movement to complete a full air intaking stroke of each piston with the strokes of the two pistons overlapping each other approximately fifty per cent, i. e. the first half of the stroke of the rotating piston to enlarge chamber 22 will overlap the second half of the stroke of the vane on its enlargement of chamber 10. Therefore, the porting is so arranged that air will be inflowing from the inlet recess 30 into both chambers 22 and 10 during this interval of overlap which approximates one-quarter cycle of operation. The inlet passage 33 will close off, after the fullest enlargement of the chamber (21 or 22), by its blocking engagement with one of the flat side walls 23, while the interruption between the inlet recess and the vane chamber (10 or 11) will occur by movement of the facial groove 36 from over the respective wall port.

For exhausting the chambers 21 and 22 as they are alternately ensmalled by the rotating piston, the latter is formed with a groove 41 in its rear face concentric with respect to the rotative axis and having communication through the periphery of the piston by a radial passage 42. Consequently, as either chamber begins to ensmall the egress of fluid is through passage 42, groove 41 and thence by a radial slot 43 inwardly through a port 44 in the shaft 25 to an axial bore 45, which latter opens at 46 into the crank case for exhausting the air and sealing oil thereinto. The port 44 may terminate outwardly in the form of a peripheral groove on the shaft to insure communication with the slot 43 when the piston is fastened to the shaft by inserting the key 47 in the keyway 48. At the completion of each exhaust stroke the radial passage 42 is closed by its blocking engagement with the flat side chamber wall 23 toward which it has advanced.

To evacuate the vane chambers 10, 11, the line of communication is through the passageways 12, 39 and 37 and 13, 40 and 38, respectively, so that these passageways constitute combined intake and exhaust passages and function in their individual capacities in accordance with their relation to the facial grooves 36 and 41, both of which are on the same radius and alternately move across the ports 37 and 38. The order or progression of exhaust movements is similar to that described in connection with the indraft of fluid. Each chamber exhausting movement of one piston overlaps approximately the first half of the next following exhaust stroke of the companion piston.

It will, therefore, be obvious from the foregoing that when pumping fluid, either gas or liquid, each intake cycle of the multiple pump is composed of four intake cycles of the pistons in the four chambers in progressive order, and similarly each exhaust cycle of the whole comprises the four exhaust cycles of the two pistons. Both the intake and exhaust are determined by the mechanical porting of the rotary piston alone. All of the sliding contacts between moving parts are effectively sealed, when pumping air or gas, by the restricted input of oil through the port 29 without flexible packing or packing rings of any kind. Consequently, power required for pump operation is kept down to a minimum. The two pistons move about fixed axes and the power for driving one piston is transmitted through the other. The secondary pump unit is self-contained within the vane of the primary unit and both units coact to provide a four cycle pump action which is practical and efficient. Obviously, the mechanical porting by the rotative piston is applicable to a structure wherein the outer piston has a purely rectilineal movement.

The four cycle action equalizes or divides the torque in four locations and tends to flatten out the impulses. When operating as a suction pump the sealing oil will tend to flow into the chambers toward the suction side and any oil which does enter will build up in advance of the piston on the next stroke to more effectively seal the sliding engagement. In this connection it will be observed that the vane has a rather extensive surface contact with the casing wall for greater sealing effectiveness. The piston 20 is a unitary member, rotating in its chamber, and by such rotation effects the air displacement by reason of its peripheral seal with the chamber walls and its motion about an eccentric axis. The piston 8, by reason of pivotal mounting, oscillates in sealed contact with the arcuate surfaces 15 and 17 which surfaces may readily be ground or finished by a finishing tool of like radius.

While the rotative piston is preferably cylindrical in shape it might be of other cross sectional contour, the essential thought in this respect being to have a sealing contact with the side walls 23 on the working stroke, i. e. the intaking stroke when the pump is used for producing suction or the expelling stroke if the pump be utilized for producing superatmospheric pressure, in order to render the eccentric or crank motion of the piston effective for the displacement of the fluid being acted upon.

It will be understood that the apparatus described and shown herein is merely illustrative of the inventive principles involved, which may be applied to other physical embodiments without departing from the scope and spirit of the invention claimed.

I claim:

1. A pump having a piston of cylindrical cross section and eccentrically mounted for rotation, a member having a substantially elliptically shaped inner wall surrounding said piston and pivotally mounted at a point spaced from the center of rotation of said piston, said member having a transverse interior dimension substantially equal to the diameter of said piston and a greater longitudinal dimension whereby rotation of said piston will oscillate said member and said piston will alternately occupy and vacate the excess space in said member at the ends thereof for fluid pumping action, and a casing surrounding said member, said casing having an interior longitudinal dimension substantially equal to the exterior longitudinal dimension of said member and an interior transverse dimension greater than the exterior transverse dimension of said member, said member constituting and serving as an oscillatory piston whereby as said first piston is rotated the eccentric portion thereof in addition to pumping fluid will oscillate the second piston within the casing for fluid pumping action, and inlet and outlet means for the fluid displacing actions of both pistons.

2. A pump comprising a casing having a chamber, a piston mounted for back and forth movement along a definite path in the chamber to displace fluid therefrom and itself formed with a chamber separate from the casing chamber and elongated in a direction crosswise of the path, a shaft journaled in the casing, a rotary piston fixed eccentrically on the shaft and arranged in the second chamber to displace fluid therefrom, the periphery of the rotary piston camming directly on opposing side wall portions of the second chamber to impart the back and forth movement to the first piston, the diameter of the rotary piston being substantially equal to the spacing apart of the opposing side wall portions, and inlet and outlet means controlling the movement of fluid into and out of the chambers.

3. A pump comprising a casing having a chamber, a piston mounted for back and forth movement along a definite path in the chamber to displace fluid therefrom and itself formed with a chamber having a longitudinal dimension extending crosswise of the path, a shaft journaled in the casing, a rotary piston fixed eccentrically on the shaft and arranged in the second chamber to displace fluid therefrom, the periphery of the rotary piston camming directly on opposing side wall portions of the second chamber to impart the back and forth movement to the first piston, and inlet and outlet port means for the two chambers, one of the port means for the casing chamber including a port opening through a casing wall into the second chamber and the rotary piston having a side face formed with a passage adapted to register with the port during a part of the cycle of the rotary piston for communication with such port, there being other passage means communicating with the passage in the side face for the flow of the pumped fluid.

4. A pump having a casing with a chamber, a piston pivoted in the chamber for back and forth movement and itself provided with a chamber separate from the casing chamber, a second piston in the second chamber mounted for rotary movement about an eccentric axis and during such movement having its periphery bearing on the opposing side walls of the second chamber for serving in the capacity of a cam thereon to reciprocate the first piston, the opposing side walls extending transversely of the path of movement of the first piston, and inlet and outlet port means directing fluid movements through the chambers.

5. A pump having a chambered casing with a pair of pistons mounted therein to move about parallel axes, one piston being chambered and mounted to oscillate and the companion piston rotating eccentrically in such piston chamber and having its periphery in camming contact with the opposing side walls of the latter to serve as the drive for the first specified piston to oscillate the latter, means for rotating said companion piston about its axis, and valved ports arranged for controlling fluid displacement by both the oscillating piston and the rotating piston.

6. A pump having a chambered housing, a piston movable back and forth in the housing chamber between the side walls thereof and in sliding contact therewith, said piston having a self-contained chamber, separate from the housing chamber and having opposing side portions extending transversely of the path of movement of the piston, a rotary piston eccentrically journaled in the side walls of the housing chamber with its side faces in sliding contact with such side walls, the periphery of the rotary piston camming on said opposing side portions of the self-contained chamber to impart such back and forth movement to the first piston, said eccentrically disposed periphery moving into and out of the opposite end portions of the self-contained chamber to effect fluid displacement therefrom, and inlet and outlet means for the two chambers.

7. An air pump having a chambered casing, a piston movable back and forth in the casing chamber between the side walls thereof and itself provided with a chamber closed by the casing walls, a rotary piston eccentrically journaled in the casing walls with its periphery in sliding and camming contact with opposed wall portions of the chamber in the first piston, both pistons having sliding engagement with the casing and the rotary piston having its eccentric periphery acting also directly upon the fluid in the second chamber whereby the rotary piston functions in a dual capacity, a port for admitting a restricted quantity of oil to seal and lubricate such sliding engagements, one of said pistons moving over such oil port to spread the admitted oil, and inlet and outlet means for the chambers at opposite sides of their respective pistons, the sealing oil being discharged through the outlet means.

8. A pump having a chambered casing with an inlet and an outlet, a piston movable back and forth in the casing chamber between the side walls thereof and itself provided with a chamber closed by the casing walls, and a rotary piston eccentrically journaled in the casing for causing its eccentric periphery to directly act on the fluid in the second chamber for displacing action, said eccentric periphery also camming on opposing wall portions of the second chamber to directly drive the first piston back and forth, and port means in the casing leading from the casing chamber fore and aft of the first piston and opening in the second chamber against the rotary piston, the rotary piston having transfer passage means communicating with the port means and with the casing inlet and outlet at timed intervals during rotation for intaking and exhausting the casing chamber fore and aft of the first piston, said rotary piston having other passage means communicating directly with the second chamber during such rotation for the pumping of fluid by each piston.

9. A pump having a chambered casing with an inlet and an outlet, a piston movable back and forth in the casing chamber between the side walls thereof and itself provided with a chamber closed by the casing walls, and a rotary piston eccentrically journaled in the casing for causing its eccentric periphery to directly act on the fluid in the second chamber for displacing action, said eccentric periphery also camming on opposing wall portions of the second chamber to directly drive the first piston back and forth, one side wall having a combined inlet and outlet passage leading from each side of the casing chamber and opening into the second chamber, said rotary piston having side facial passages for operatively connecting the combined inlet and outlet passages to said casing inlet and outlet, said facial passages having branch passages connecting the casing inlet and outlet directly to the second chamber fore and aft of the rotary piston.

10. A chambered casing having inlet and outlet ports, a fluid displacing piston pivotally related to the casing and itself formed with a chamber having parallel front and back walls, a rotative piston of cylindrical form having a diameter substantially equal to the distance between said walls and journaled in the casing for peripheral movement about an eccentric axis to cam on said front and back walls for imparting back and forth movement to the first piston, the camming periphery of the rotative piston moving into and out of the opposite end portions of the second chamber for direct fluid displacing action, and means for operatively opening the chambers to intake and exhaust fluid through the casing ports.

11. A chambered casing having inlet and outlet ports, a fluid displacing piston movable back and forth in the casing and itself formed with a chamber having parallel front and back walls, a rotative piston of cylindrical form having peripheral parts in fluid tight and sliding contact with the walls, said rotative piston journaled eccentrically and serving as a driving crank operating directly on the first piston, such eccentric motion of the rotative piston being directly effective on the fluid in the second chamber for the displacement of fluid therefrom, and means operatively opening the chambers to intake and exhaust fluid through the casing ports.

12. A pump having a piston of cylindrical cross section and eccentrically mounted for rotation, a member mounted for back and forth movement and having a substantially elliptical shaped chamber surrounding said piston, a casing surrounding both the piston and the member and providing support therefor, the chamber of said member having a transverse interior dimension extending transversely of the path of movement of the member substantially equal to the diameter of said piston and a greater longitudinal dimension whereby rotation of said piston will reciprocate said member within said casing and during such rotation said piston will alternately occupy and vacate the excess space in the opposite ends of the chamber of said member for fluid pumping, the casing providing a chamber in which said member has sliding fit for pumping action whereby as said piston is rotated the eccentric portion thereof is shifted longitudinally of the chamber in said member to alternately occupy and vacate the ends of the member chamber for fluid pumping and also said member is shifted transversely to alternately occupy and vacate the portions of the casing chamber at opposite sides of said member for fluid pumping, and inlet and outlet means for the fluid displacing action of both the piston and the member.

13. A pump comprising a casing having a chamber, a piston movable back and forth in the chamber to displace fluid therefrom and itself formed with a chamber closed at both ends and having a major axis extending transverse to the path of movement of the piston, a rotary camming piston journaled in the casing and disposed in the second chamber, said rotary piston being circular in cross section with the opposite end walls of the second chamber being shaped substantially to receive the fluid displacing periphery of the rotary piston, the sides of the second chamber having bearing portions on which the periphery of the rotary piston has camming contact for driving the first piston back and forth, the diameter of the rotary piston being substantially equal to the spacing of said opposed bearing portions for effectively sealing the opposite end portions of said second chamber one from the other during fluid displacing action of the rotary piston, and inlet and outlet means for the two chambers.

14. A pump comprising a casing having a chamber with an inlet, a piston pivotally mounted in the chamber for back and forth fluid displacing oscillation, said piston having a radially extending chamber with front and back side walls, a shaft journaled in the casing and having an axial passage discharging exteriorly thereof, a cylindrical member fixed eccentrically on the shaft and having a passage communicating with the axial discharge passage, and passaage means establishing communication between the member passage and the casing chamber for the displacement of fluid from in advance of the piston as the latter oscillates back and forth.

15. A pump comprising a casing having a chamber with an inlet, a piston pivotally mounted in the chamber for back and forth fluid displacing oscillation, said piston having a radially extending chamber with front and back side walls, a shaft journaled in the casing and having an axial passage discharging exteriorly thereof, a cylindrical member fixed eccentrically on the shaft and having a passage extending radially inward from the periphery to the axial discharge passage, and other passage means for conducting fluid from the casing chamber for discharge through the member passage and the axial discharge passage.

ANTON RAPPL.

CERTIFICATE OF CORRECTION.

Patent No. 2,260,867. October 28, 1941.

ANTON RAPPL.

It is hereby certified that error appears in the printed specification of the above numbered patent requiring correction as follows: Page 3, second column, line 39, claim 6, strike out the comma; page 4, second column, lines 4 and 5, claim 12, strike out the words "extending transversely of the path of movement of the member" and insert the same before "whereby" in line 7, same claim; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.